United States Patent Office 2,947,615
Patented Aug. 2, 1960

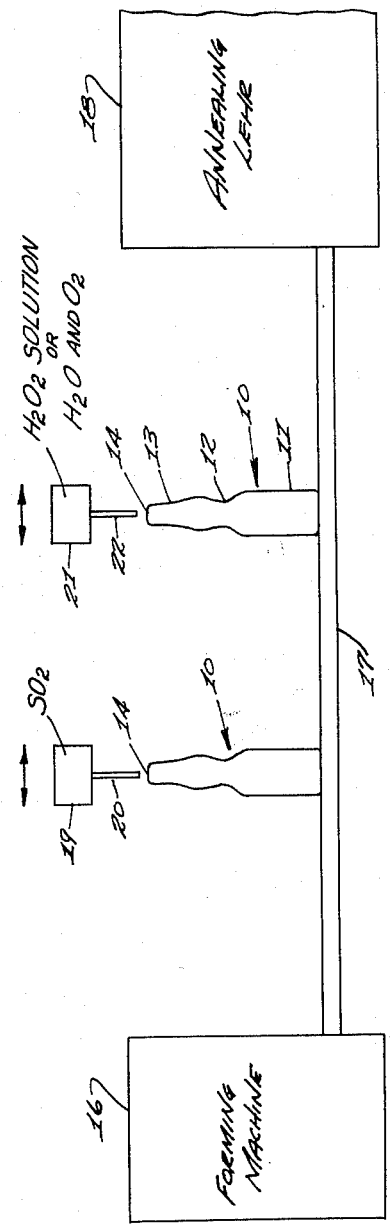

2,947,615

METHOD OF TREATING THE SURFACES OF GLASS CONTAINERS

Joseph F. Greene and Neill H. McCallum, Jr., Vineland, N.J., assignors to Owens-Illinois Glass Company, a corporation of Ohio Filed May 31, 1956, Ser. No. 588,279

4 Claims. (Cl. 41—42)

The present invention relates to an improved method of surface treatment of glass containers and more particularly to treating the internal surfaces of glass bottles, jars, or ampuls to reduce their chemical reactivity.

In the manufacture of glass articles, various small amounts of alkali are brought to the surface of the glass during their formation. These amounts, although minute by ordinary standards, are objectionable in glass containers in certain fields of packaging such as in the pharmaceutical or medicinal industries which utilize glass vaccine bottles or ampuls. The surface alkali is usually present in a thin layer of high alkali glass which is characterized by greater leachability and chemical reactivity. The resultant alkalinity is occasionally sufficient to cause deleterious effects on contained pharmacopoeial preparations by reaction therewith to render them unacceptable. Detrimental changes in water and aqueous solutions for injection, for example, which tend to leach alkalis on storage, must be carefully guarded against. For this reason the initial interior surface alkalinity of glass containers must be kept to a minimum.

Previous practice has consisted of introducing sulphur in the form of powder or pellets into glass containers to create an atmosphere of acidic gases of sulphur dioxide and sulphur trioxide therein which with moisture form sulphuric acid. This acid in turn reacts with the alkalis in the surface layer of the glass. Introducing a solid material is impracticable in the case of ampuls having long narrow stems and small openings due to rapid manufacturing operations and their relatively small unit cost. Likewise subjecting the containers to an overall acidic gas atmosphere in a lehr or oven is unsatisfactory because of inadequate action upon their interiors. These difficulties have been partially solved by the apparatus and method disclosed in the copending patent application of Joseph F. Greene and Arthur L. Hinson, entitled "Apparatus and Method for Treating Interior Surfaces of Glass Containers," Serial No. 540,250, filed October 13, 1955. However, a more intensified treatment is required in some cases to package certain products which are highly susceptible to reaction with surface alkalinity.

Accordingly, it is an object of this invention to provide an improved method for the treatment of inner surfaces of glass containers during their uninterrupted manufacture by introducing acidic and oxidizing materials into their interiors to effect the treatment.

Another object of this invention is to provide an economical method of reducing the alkalinity of internal surfaces of small-mouthed glass bottles and ampuls during their manufacture.

Another object of this invention is to provide a simple method of treating the interiors of glass containers whereby acidic and oxidizing reagents are introduced therein to quickly react with and reduce the alkalinity of internal surfaces with maximum utilization of reagents.

The specific nature of this invention, as well as other objects and advantages thereof, will become apparent to those skilled in the art from the following detailed description taken in conjunction with the annexed sheet of drawings on which, by way of preferred example only, is illustrated one embodiment of this invention.

A schematic diagram of the present invention as pertaining to glass ampuls is illustrated on the accompanying drawing.

When water of high purity is autoclaved in a sealed ampul, its pH increases. Therefore, the pH increase of distilled water after being autoclaved in an ampul furnishes a test of surface alkalinity. Also measuring the titratable alkalinity of water contained in ampuls is accomplished by autoclaving ampuls filled with pure water at 121° C. for thirty minutes. The ampuls are then opened and the sample is then titrated with 0.02 N sulphuric acid using methyl red indicator. This procedure is briefly that set forth in U.S. Pharmacopeia, 14th Revision, in the section relating to glass containers. Ampuls having the desired low alkalinity show both a low pH increase and a low titration value.

It has been found that in the case of ampuls of relatively high alkalinity, treatment with sulphur dioxide with moisture added does not reduce the alkalinity in every instance to the low levels required to pass the U.S.P. specifications for water for injection. After injecting sulphur dioxide gas and moisture into the ampuls their initial high alkalinity is occasionally still shown to be higher than acceptable. A more vigorous treatment is necessary to increase the attack of the acidic gases upon the alkaline layer. The use of an oxidizing agent with sulphur dioxide to accomplish this has been found to be beneficial.

Oxidizing reagents which have been successfully used have consisted of an aqueous hydrogen peroxide solution or oxygen and water, either of which is sprayed into the ampuls following the introduction of sulphur dioxide gas. A dilute solution of hydrogen peroxide and water of prescribed strength is sprayed into each ampul to combine chemically with the sulphur dioxide gas for neutralization reaction upon the glass surfaces. Good treatment has been achieved with hydrogen peroxide of about 3% strength and very good results have been attained with a 15% hydrogen peroxide solution. Naturally, it is preferable to use a peroxide solution as weak as possible which will give the desired results. Moisture is necessary in practicing the method either in the form of a finely atomized spray of water or an aqueous solution of an oxidizing reagent such as dilute hydrogen peroxide.

The single figure of the drawing schematically represent the process of the present invention.

As shown on the drawings, the ampuls 10 are formed by a forming machine 16 and transported in recumbent positions at spaced-apart intervals upon a conveyor 17 to an annealing lehr 18. Each of the ampuls 10 has a cylindrical body portion 11, a restricted neck 12, and a tapered stem 13. The extremity of the stem 13 has an opening 14 providing access to the ampul interior. A supply source 19 is located adjacent to the openings 14 of the conveyed ampuls 10 which may or may not possess considerable residual heat from the forming operation, to introduce an acidic gas such as sulphur dioxide into each ampul 10. A small nozzle 20 leading from the supply source 19 is positioned opposite to and in alignment with the ampul openings 14 for the introduction of a portion of the gas stream. The nozzle 20 may be stationary or reciprocating, single or multiple, depending upon the shape of the ampuls 10 and the extent of treatment desired. Where the nozzle 20 is a reciprocating type, it repeatedly cycles through an arcuate path to follow for a brief period of time the movement of each conveyed ampul 10. A controlled amount of sulphur dioxide gas is then introduced into each ampul 10 during this synchronized movement. One, two or more milliliters of sulphur dioxide gas may be introduced into each ampul 10 depending upon various factors such as its volumetric size, the chemical characteristics of the particular glass, the shape of the ampul, and the duration of the gas-injecting interval. All or only part of the atmospheric air contained in each ampul is displaced by the injected sulphur doxide gas. The precise amount of displacement is neither readily susceptible of measurement nor of any degree of criticality other than evidenced by neutrality and unreactiveness of the interior of the finished article. Obviously, the quantity of sulphur dioxide gas deposited in each ampul or container varies with the interior surface thereof.

Another reagent supply source 21 is positioned adjacent to the ampul openings 14 for the introduction of an oxidizing reagent into the ampuls 10. The oxidizing reagent and acidic gas are combinedly furnished to vigorously attack the interior surfaces. A nozzle 22 is attached to the supply source 21 in proper alignment to direct a prescribed amount of oxidizing reagent into each ampul 10. Similarly the nozzle 22 may be either reciprocating or stationary as required. The oxidizing reagent preferably consists of a dilute aqueous solution of hydrogen peroxide of about 3% to 20% concentration, with about 10% preferred. The higher limit provides best results in reducing the surface alkalinity, but increased precautions must be undertaken to avoid objectionable attack upon contacted surfaces of the equipment. Control is maintained over the amount of oxidizing reagent which is introduced into the ampuls 10 by regulating the rate of reagent discharge and the time of alignment of the nozzle 22 with each ampul opening 14.

Another oxidizing reagent whch has been used consists of oxygen and water whereby the water is atomized by the oxygen gas and discharged into each ampul 10 from the nozzle 22. The action on internal surfaces using oxygen and water has been found to be slightly less vigorous than that using a hydrogen peroxide solution.

Along with the acidic gas and oxidizing reagents, sufficient moisture is placed within the ampul interior to combine with the acidic gases and increase their chemical attack. The moisture may be placed within each ampul by discharging atomized water or steam from a third nozzle (not shown) or conjunctively with either the acidic gas or oxidizing solution. Very intense reaction with the inner glass surfaces is produced so that a bloom appears on the inner surfaces of the treated ampuls 10. The bloom can be used as an indication that the ampuls have received a satisfactory treatment. If no bloom can be detected inside the ampuls, it signifies that little, if any, treatment has been accomplished. This bloom is composed largely of alkali sulphates and sulphites which remain on the inner surfaces as a whitish residue when the ampuls are discharged from the annealing lehr.

Moisture may be introduced into each ampul 10 by an aqueous hydrogen peroxide solution. The hydrogen peroxide solution or mixture of water and oxygen gas, when used, are not employed in excessive amount sufficient to displace all of the sulphur dioxide, but the oxidizing reagent is utilized merely in required amount to fully react with the available contained sulphur dioxide previously deposited for conversion to sulfuric acid for complete reaction with the ampul interior. Obviously, the precise requirements of reagents may be varied through wide limits.

The discharge nozzles 20 and 22 need not penetrate the ampul stems 13 and may be spaced about several millimeters therefrom. The nozzles 20 and 22 are fabricated from stainless steel tubing such as 22 gauge hypodermic needle tubing which is suitable to resist the corrosive action of the reagents and provide a fine spray. The nozzles are spaced apart about six to eight inches to allow the sulphur dioxide gas on external surfaces of the ampuls 10 to dissipate prior to exposure to the oxidizing spray.

A summary table of results based upon titratable alkalinity of autoclaved water follows:

| Kind of Treatment | Titration | | |
|---|---|---|---|
| | Before | After | Reduction |
| Sulphur dioxide+water | .46 | .24 | .22 |
| Sulphur dioxide+Hydrogen peroxide sol | .46 | .05 | .41 |
| Sulphur dioxide+Hydrogen peroxide | .44 | .04 | .40 |
| Sulphur dioxide+water/oxygen | .43 | .08 | .35 |

The present invention thus furnishes a more intensified treatment of ampuls utilizing an acidic gas and an oxidizing spray. The titratable alkalinity and pH of the ampuls have been reduced approximately 60% to 90%. No undesirable constituents or residue remain in the ampuls from the treatment which cannot be removed by a simple water rinse. This rinse is usually performed immediately prior to filling.

Additionally, interior flaking of ampuls has also been reduced extensively from 30% to 0 in the ampuls tested. The breaking strength and quality of hand breaks in opening the ampuls have not been affected by the treatment. Also the appearance of color bands on ampul stems to control and facilitate hand breakage is not affected by the treatment.

Additional modifications may be resorted to within the spirit and scope of the appended claims.

We claim:

1. The method of reducing the alkalinity of the interior surfaces of a glass container having a restricted neck opening comprising the steps of introducing gaseous sulfur dioxide through said neck opening, separately introducing through said neck opening an oxidizing reagent selected from the group consisting of moisture with hydrogen peroxide and moisture with substantially pure oxygen, and subjecting said container interior surfaces, sulfur dioxide and oxidizing reagent to an elevated temperature.

2. In a method of reducing the alkalinity of the interior glass surfaces of an ampul by the separate injection of gaseous sulfur dioxide and moisture into the ampul to form sulfurous acid in situ followed by heating of the ampul during an annealing operation, the improvement of injecting an oxidizing agent selected from the group consisting of substantially pure oxygen and hydrogen peroxide in admixture with the moisture to at least partially convert the sulfurous acid to sulfuric acid.

3. In a method of making a glass ampul, the steps of forming sulfuric acid interiorly of the ampul by the injection into said ampul of sulfur dioxide, moisture and an oxidizing agent selected from the group consisting of hydrogen peroxide and substantially pure oxygen, combining the injected materials only internally of the ampul to form $H_2SO_4$, and heating the ampul and contents to react the $H_2SO_4$ formed in situ with the interior surfaces thereof, thereby reducing the alkalinity of said interior surfaces.

4. In a method of treating the interior surfaces of a glass container having a restricted neck opening, the steps of injecting through said neck opening a plurality of reagents consisting essentially of gaseous sulfur dioxide and an aqueous solution of hydrogen peroxide of sufficient strength to at least partially convert to sulfuric acid the sulfurous acid formed by the reaction of the sulfur dioxide and the water, and maintaining said container and the plurality of reagents therein at an elevated temperature to react the reagents with the interior surfaces of said container.

References Cited in the file of this patent

UNITED STATES PATENTS

| | | |
|---|---|---|
| 1,782,169 | Kamita | Nov. 18, 1930 |
| 2,175,076 | Burch | Oct. 3, 1939 |
| 2,238,153 | Blau | Apr. 15, 1941 |
| 2,331,041 | Noble | Oct. 5, 1943 |
| 2,418,202 | Stanworth | Apr. 1, 1947 |
| 2,515,372 | Johnson et al. | July 18, 1950 |
| 2,525,725 | Rodman | Oct. 10, 1950 |

FOREIGN PATENTS

| | | |
|---|---|---|
| 556,602 | Great Britain | Oct. 12, 1943 |

OTHER REFERENCES

Glastechnische Berichte, vol. 14, 1936, "Veber die Reaktionen von Silikaten mit Schwefeldroxyd," Takats, pp. 103–105.